UNITED STATES PATENT OFFICE.

BERNICE J. NOYES, OF BOSTON, MASSACHUSETTS, ASSIGNOR TO THE NEW ENGLAND REFRIGERATOR COMPANY, OF CONCORD, NEW HAMPSHIRE, A CORPORATION OF NEW HAMPSHIRE.

REFRIGERATING APPARATUS.

973,548.  Specification of Letters Patent.  Patented Oct. 25, 1910.

Application filed May 28, 1910. Serial No. 563,839.

*To all whom it may concern:*

Be it known that I, BERNICE J. NOYES, residing at Boston, county of Suffolk, and State of Massachusetts, have invented an Improvement in Refrigerating Apparatus, of which the following is a specification.

This invention relates to a refrigerating apparatus adapted for cooling compartments of considerable size, and employing brine as a cooling medium, which is taken from a tank and forced through circulation-pipes contained in the compartment to be cooled, the brine being cooled while in the tank by pieces of ice which are more or less submerged therein; and the invention is intended as an improvement upon the refrigerating apparatus shown in Letters Patent #952,040, dated March 15, 1910. In said patent the brine, on returning from the circulation pipes to the tank, passes through a salt-receptacle, and then to the pieces of ice contained in the tank. This system is not as economical of salt as is sometimes desired; and the object of this invention is to provide means for passing but little brine through the salt-receptacle, yet enough to maintain the brine at a high degree of concentration.

Figure 1:
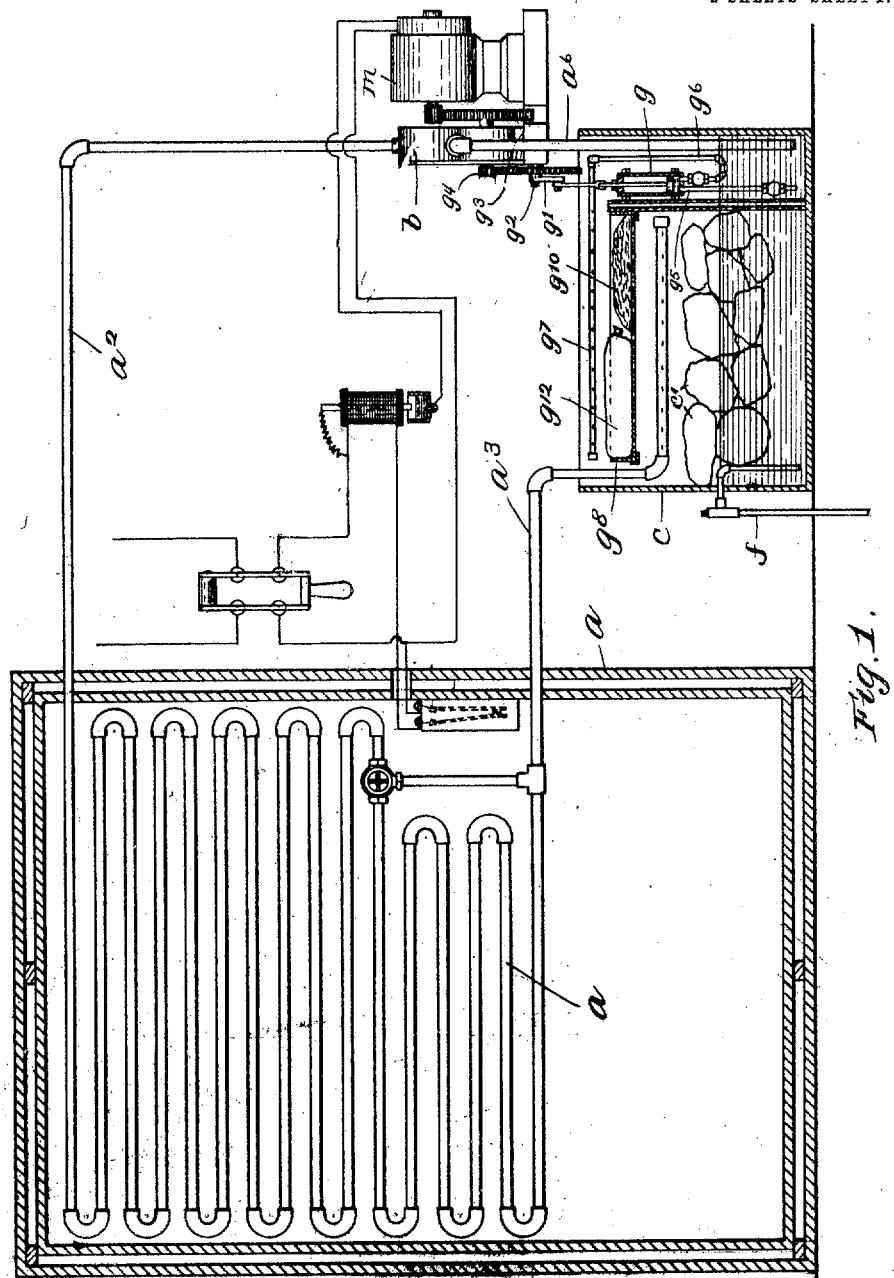
Figure 2:
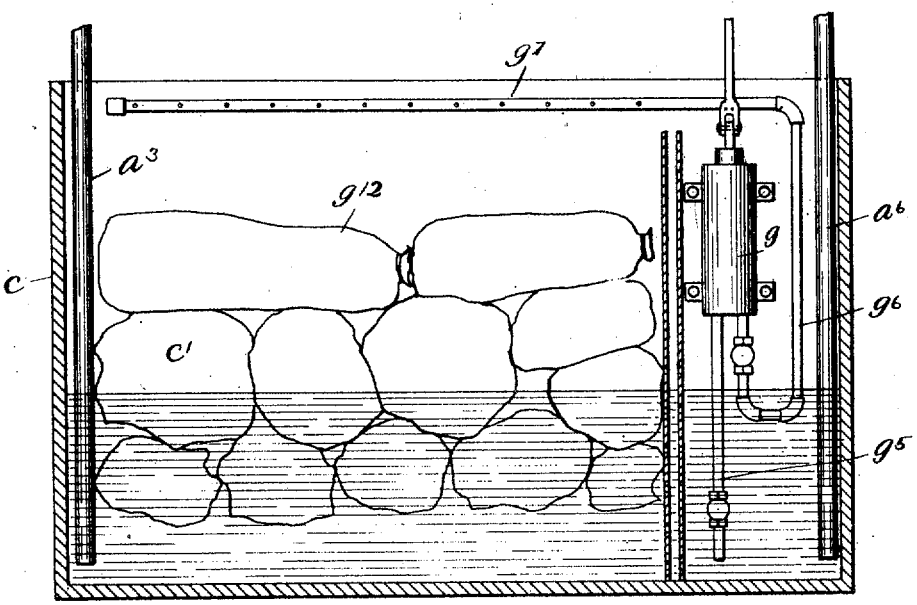
Figure 3:
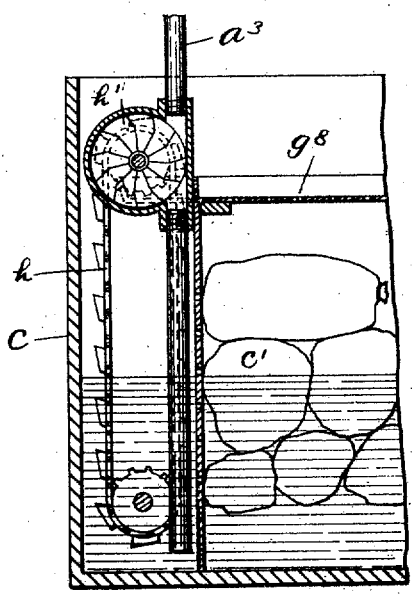

Figure 1 is a vertical section of a refrigerating apparatus embodying this invention. Fig. 2 is a modification to be referred to. Fig. 3 is another modification to be referred to.

$a$ represents the compartment to be cooled; $a'$ the circulation pipes arranged in said compartment, connected at one end by a pipe $a^2$ with a pump $b$; and having a pipe $a^3$ at the other end leading into a brine-tank $c$.

A pipe $a^6$ extends from the pump $b$ to the brine-tank $c$, and serves as the go-pipe, while the pipe $a^3$ serves as the return.

$m$ represents an electric-motor for operating the pump, and, as the pump is operated, the brine from the tank is forced through the circulation-pipes in the compartment to be cooled and returned to the tank. The tank is adapted to contain brine and pieces of ice $c'$, which latter are more or less submerged in the brine. The tank is provided with a suitable overflow-pipe $f$, arranged to maintain a low level of brine in the tank.

The portion of the return-pipe $a^3$, which enters the tank, may be perforated and extended over the pieces of ice, as shown in Fig. 1, or it may terminate at any desired point inside of the tank as shown in Fig. 2, so far as this invention is concerned.

The pump $b$ may be automatically controlled by any suitable thermostatic means. As said pump is operated the brine is taken from the tank and conducted to the cooling pipes and thence returns to the tank, and, as shown in Fig. 1, it is delivered upon the pieces of ice contained in the tank, which is the preferable construction.

For the purpose of adding salt to the brine and for maintaining it at a high degree of concentration, means are provided for conducting brine to a foraminous receptacle containing salt; but such means is constructed and arranged to conduct only a small quantity of brine to the salt receptacle, as contrasted to passing the brine returning from the circulation pipes through the salt-receptacle, as shown in patent aforesaid.

In Fig. 1 is shown one form of means embodying this invention which may be employed for conducting brine to the salt-receptacle. In said figure $g$ represents another pump, which may be of any suitable construction, and is here shown as a piston-pump. It is connected with a crank-arm $g'$, on the shaft $g^2$ of a gear wheel $g^3$, which is engaged and driven by a pinion $g^4$ secured to the shaft of the pump $b$, so as to be driven by the motor $m$. But it will be understood that said pump $g$ may be otherwise operated. A pipe $g^5$ is connected with the inlet of said pump, which extends down into the brine in the tank $c$, and another pipe $g^6$ is connected with the outlet of said pump, which has a perforated portion $g^7$, extended over the salt receptacle $g^8$. Said receptacle has a foraminous bottom, and is arranged in or above the tank $c$, and above the pieces of ice therein, and is adapted to contain salt, which may placed loosely in said receptacle, as shown at $g^{10}$, or contained in bags $g^{12}$ of burlap. As pump $g$ is operated, the brine is taken from the tank and delivered to the salt-receptacle, and returns by passing through the foraminous bottom of said receptacle on to the pieces of ice contained in the tank. The pump $g$ is of much less capacity than the pump $d$, so that but little brine is conducted by it to the salt-receptacle, but enough to dissolve sufficient salt to maintain the brine at a high degree of concentration. The pump $g$ is preferably detachably connected with the crank-arm $g'$, so that it may be disconnected whenever desired. Said pump $g$ serves as an independent means for conducting brine from the tank to the salt-receptacle.

Referring to Fig. 2, similar independent means for conducting a relatively small quantity of brine to the salt is shown, but in this instance the salt is contained in bags which are foraminous and rests on the pieces of ice, and the return pipe $a^3$ extends down into the tank at one end.

Referring to Fig. 3, a modified means for conducting brine to the salt-receptacle $g^8$ is shown, wherein a chain pump $h$ is employed of any well known or suitable construction, which is arranged within the tank and extended down into the brine in said tank, and is adapted to conduct the brine from the tank to the salt-receptacle. Said chain pump may be operated by a rotary motor $h'$ of any suitable construction arranged to be operated by the force of the brine returning from the circulation pipes, and which is under some pressure by the action of the pump $b$. Said modified means however merely illustrates another independent means which may be employed for carrying out this invention, whereby only a relatively small quantity of brine is conducted to the salt-receptacle.

I claim:—

1. In a refrigerating apparatus, the combination with a tank adapted to contain brine and pieces of ice, circulation-pipes connected with said tank and means for conducting brine from the tank to said circulation-pipes, of a foraminous receptacle for salt, and independent means for conducting brine from the tank to said salt-receptacle from which it returns to the tank, substantially as described.

2. In a refrigerating apparatus, the combination with a tank adapted to contain brine and pieces of ice, circulation pipes connected with said tank, and a pump connected with said circulation pipes, of a foraminous receptacle for salt arranged above the pieces of ice in the tank, and separate means for conducting the brine from the tank to said receptacle, through which it passes to the pieces of ice, substantially as described.

3. In a refrigerating apparatus, the combination with a tank adapted to contain brine and pieces of ice, circulation pipes contained in a compartment and connected with said tank, and a pump connected with the circulation pipes, of a foraminous receptacle for salt arranged above the ice in the tank, a perforated pipe extending over said receptacle, and a pump connected with it, and a pipe leading from said pump to the brine in the tank, whereby the brine is conducted from the tank to the receptacle, substantially as described.

4. In a refrigerating apparatus, the combination with a tank adapted to contain brine and pieces of ice, circulation-pipes arranged in a compartment to be cooled and connected with said tank, and means for conducting brine from the tank to said circulation-pipes, of a foraminous receptacle for salt arranged above the pieces of ice contained in said tank, a perforated pipe extended over said receptacle and means for conducting brine from the tank to the perforated pipe, substantially as described.

5. In a refrigerating apparatus, the combination with a tank adapted to contain brine and pieces of ice, circulation-pipes contained in a compartment and connected with said tank, and a pump connected with the circulation-pipes, of a foraminous receptacle for salt arranged above the ice in the tank, a perforated pipe extended over said receptacle, a pump connected with it and a pipe leading from said pump to the brine in the tank, whereby the brine is conducted from the tank to the receptacle, and a motor for operating both pumps, substantially as described.

In testimony whereof, I have signed my name to this specification, in the presence of two subscribing witnesses.

BERNICE J. NOYES.

Witnesses:
H. B. DAVIS,
A. P. McCLURE.